(12) United States Patent
Sakamoto et al.

(10) Patent No.: US 10,839,183 B2
(45) Date of Patent: Nov. 17, 2020

(54) WEARABLE ELECTRONIC DEVICE

(71) Applicant: CASIO COMPUTER CO., LTD., Tokyo (JP)

(72) Inventors: Kazuya Sakamoto, Kawasaki (JP); Yoshiaki Mochizuki, Hamura (JP)

(73) Assignee: CASIO COMPUTER CO. LTD., Tokyo (JP)

( * ) Notice: Subject to any disclaimer, the term of this patent is extended or adjusted under 35 U.S.C. 154(b) by 0 days.

(21) Appl. No.: 16/676,326

(22) Filed: Nov. 6, 2019

(65) Prior Publication Data

US 2020/0160016 A1    May 21, 2020

(30) Foreign Application Priority Data

Nov. 16, 2018   (JP) .................................. 2018-215868

(51) Int. Cl.
*G06K 7/14* (2006.01)
*G06K 7/10* (2006.01)

(52) U.S. Cl.
CPC . *G06K 7/1404* (2013.01); *G06K 2007/10534* (2013.01)

(58) Field of Classification Search
CPC ........... G06K 7/10881; G06K 7/10891; G06K 7/109; G06K 7/1404; G06K 2007/10534
See application file for complete search history.

(56) References Cited

U.S. PATENT DOCUMENTS

| 5,837,990 A * | 11/1998 | Shepard ............. G06K 7/10891 235/383 |
| 6,098,877 A | 8/2000 | Barkan et al. |
| 6,234,393 B1 | 5/2001 | Paratore et al. |
| 10,528,780 B2 | 1/2020 | Lim et al. |
| 2009/0121026 A1* | 5/2009 | Druker ............... G06K 7/10891 235/462.44 |
| 2014/0249944 A1* | 9/2014 | Hicks .................. G06Q 30/0281 705/17 |
| 2016/0180133 A1* | 6/2016 | Oberpriller ........ G06K 7/10891 235/462.44 |
| 2018/0167549 A1 | 6/2018 | Lim et al. |

FOREIGN PATENT DOCUMENTS

JP      2012238224 A    12/2012

OTHER PUBLICATIONS

Extended European Search Report (EESR) dated Mar. 31, 2020 issued European Application No. 19208003.4.

* cited by examiner

*Primary Examiner* — Kristy A Haupt
(74) *Attorney, Agent, or Firm* — Holtz, Holtz & Volek PC

(57) ABSTRACT

A wearable electronic device includes: an optical reader configured to read information; a wearable member to be worn so as to cover at least a part of a back of a hand and a finger; and a support part provided on a surface of the wearable member and configured to support the optical reader. The support part is formed to change a position of the optical reader during the wearable member being worn to at least two positions. The two positions are a fingertip-side and a back-side of a hand with respect to a boundary that is a third joint of the finger.

17 Claims, 9 Drawing Sheets

V−V

WEARABLE ELECTRONIC DEVICE

CROSS-REFERENCE TO RELATED APPLICATIONS

This application is based on and claims priority under 35 USC 119 from Japanese Patent Application No. 2018-215868 filed on Nov. 16, 2018, the contents of which are incorporated herein by reference.

TECHNICAL FIELD

The present disclosure relates to a wearable electronic device.

BACKGROUND ART

In the related art, as an example of a scanner device configured to optically read an image, known is a handy scanner device configured to read a barcode or a QR code (registered trademark) and to transmit information thereof to a computer and the like (for example, JP-A-2012-238224).

In the invention disclosed in JP-A-2012-238224, the scanner device is worn on a wrist, and is rotated to make an optical reader face toward a place in which a barcode of a reading target is attached. However, since the scanner device is arranged on the wrist, a rotatable angle thereof depends on an angle in which a joint of an elbow can be bent.

For this reason, for example, in a case where a barcode is attached on a top surface of a baggage located in a high place, it is difficult to make the optical reader face straightly the barcode, so that an operation is hindered.

SUMMARY OF INVENTION

A wearable electronic device related to the present disclosure includes: an optical reader configured to read information; a wearable member to be worn so as to cover at least a part of a back of a hand and a finger; and a support part provided on a surface of the wearable member and configured to support the optical reader. The support part is formed to change a position of the optical reader during the wearable member being worn to at least two positions. The two positions are a fingertip-side and a back-side of a hand with respect to a boundary that is a third joint of the finger.

DESCRIPTION OF EMBODIMENTS

First Exemplary Embodiment

Hereinbelow, exemplary embodiments of the present disclosure will be described in detail with reference to the drawings.

Figure 1:
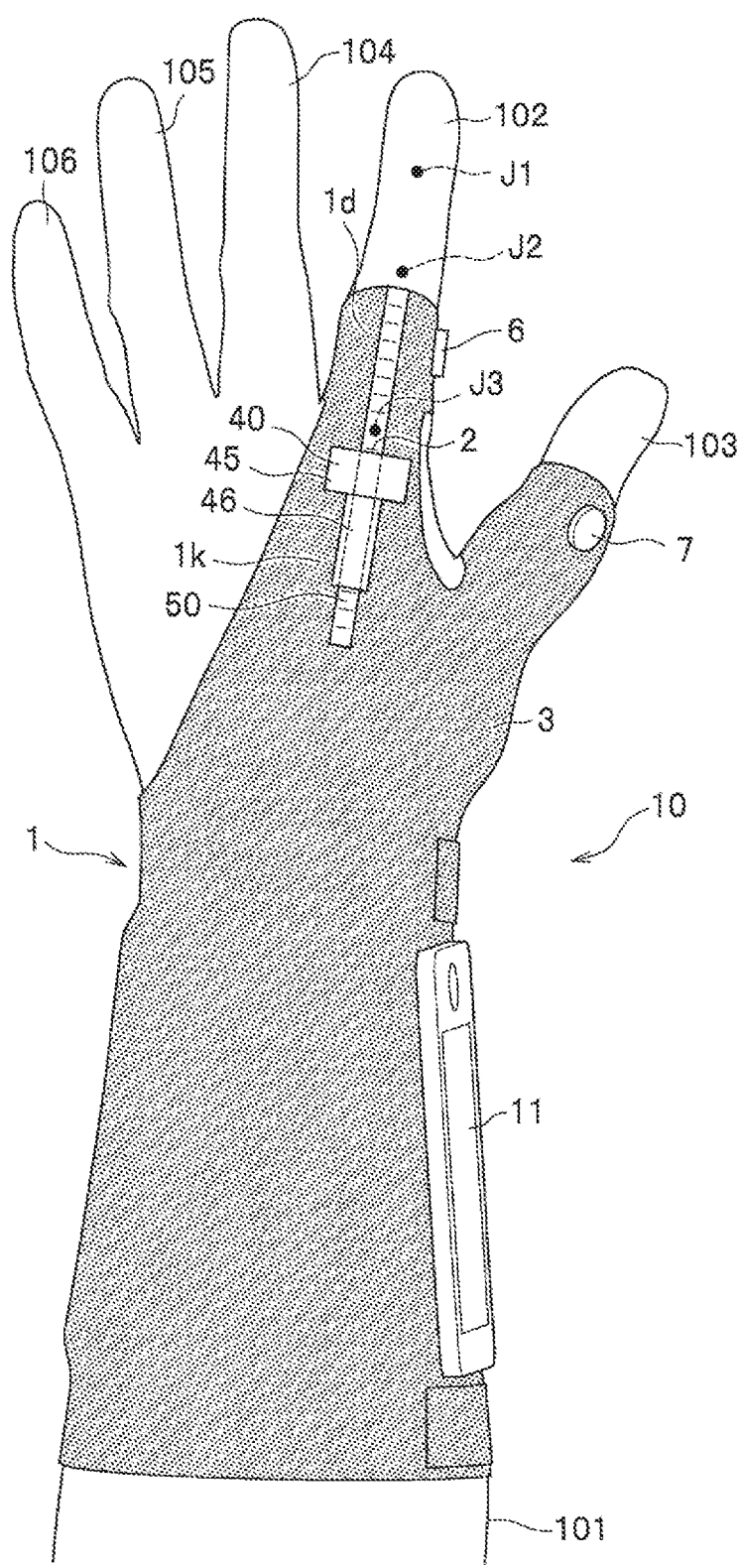
FIG. 1 is a plan view depicting an entire configuration of a wearable electronic device in accordance with a first exemplary embodiment, showing an aspect in which a wearable member is worn on an arm.

As shown in FIG. 1, a wearable electronic device 1 in accordance with a first exemplary embodiment of the present disclosure is used with being worn on an arm part 101 of a wearer (also referred to as a user or an operator). The wearable electronic device 1 includes a scanner 2 functioning as an optical reader configured to read information, a flexible wearable member 3 having a tube-shaped part formed on a tip end and configured to support the scanner 2, a power supply button 7 functioning as a first button, a scanner trigger 6 (operation button) functioning as a second button, a rail 50 functioning as a support part, and a slider 40 configured to slide the scanner 2 along the rail 50.

Figure 2:
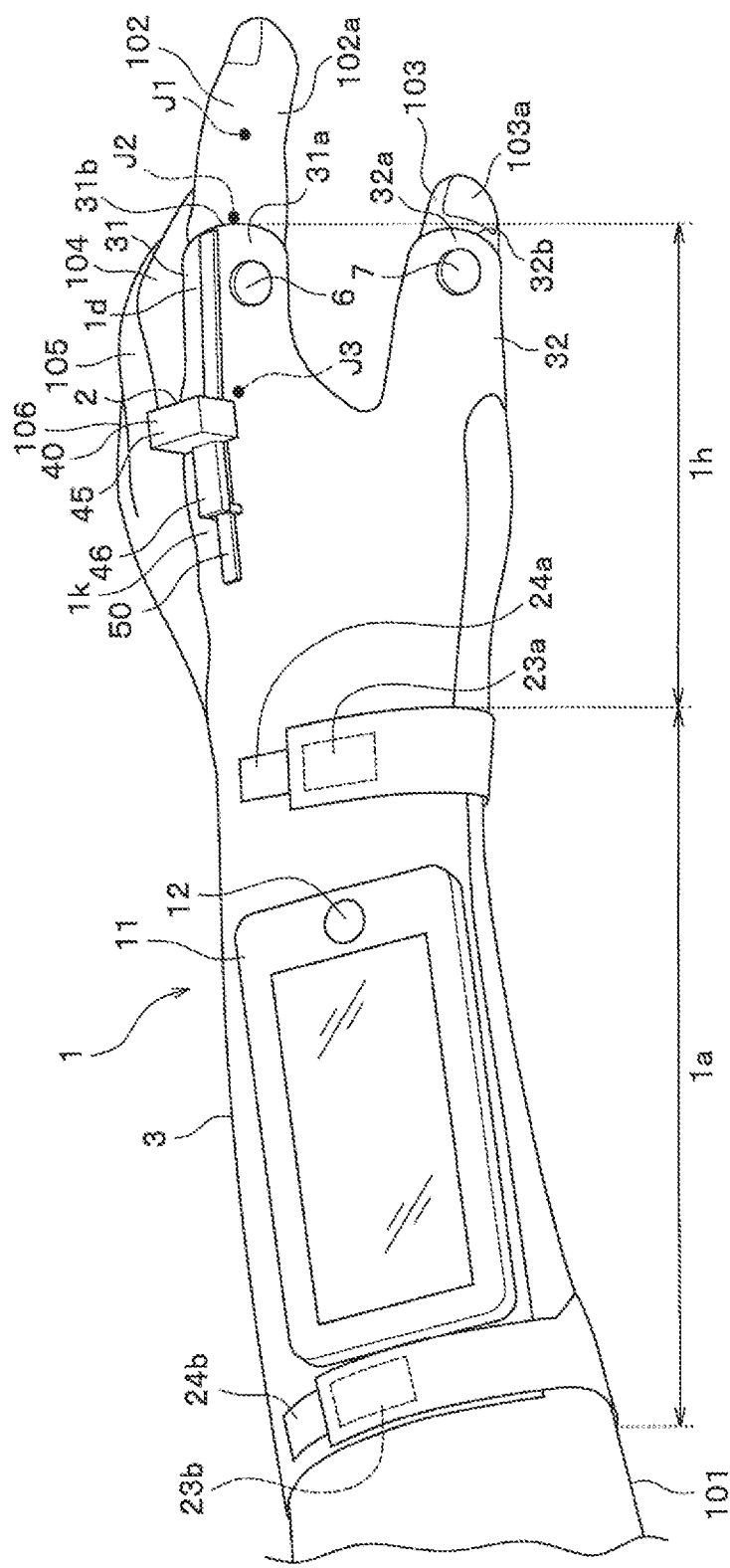
FIG. 2 is a perspective view depicting the entire configuration of the wearable electronic device in accordance with the first exemplary embodiment, showing an aspect in which the wearable member is worn on the arm.
Figure 3:
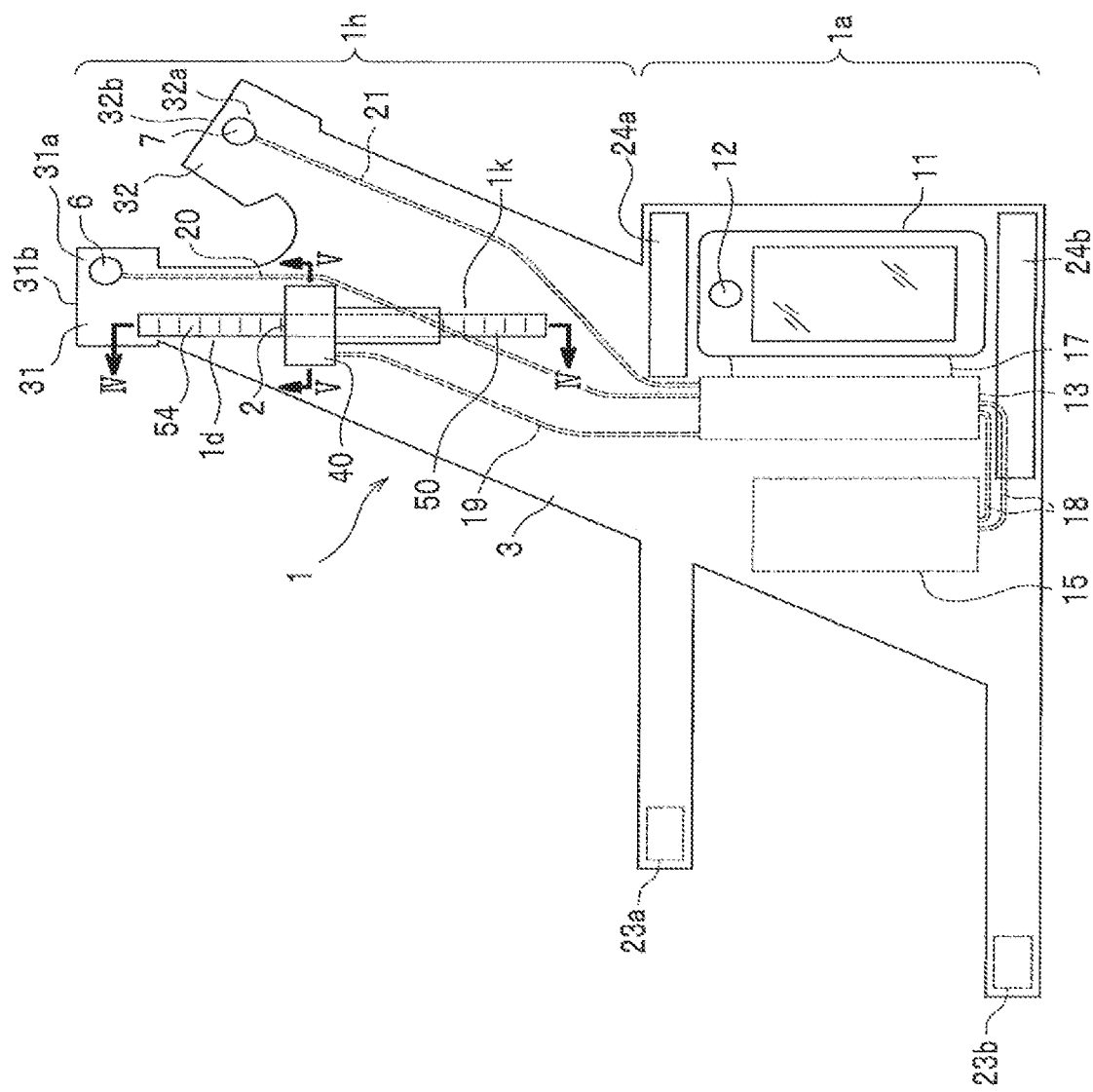
FIG. 3 is a plan view of the wearable member depicting the wearable electronic device of the first exemplary embodiment, showing a configuration of a circuit.

Also, as shown in FIG. 2, the wearable electronic device 1 of the first exemplary embodiment includes a display panel 11 provided on the wearable member 3 and functioning as a display unit having an input key button 12. Also, as shown in FIG. 3, the wearable electronic device 1 includes an electronic circuit board 13 accommodated in the wearable member 3 and functioning as a terminal main body part, and a battery 15. The electronic circuit board 13 has a control unit (CPU) embedded therein.

As shown in FIG. 3, the wearable electronic device 1 has wirings 17 to 21. The wiring 17 interconnects the display panel 11 and the electronic circuit board 13. The wiring 18 interconnects the battery 15 and the electronic circuit board 13. The wiring 19 interconnects the scanner 2 and the electronic circuit board 13. The wiring 20 interconnects the scanner trigger 6 and the electronic circuit board 13. The wiring 21 interconnects the power supply button 7 and the electronic circuit board 13.

The scanner 2 is configured to scan and decode a barcode or two-dimensional code printed on a label bonded on an article (baggage, manufactured product, commercial product and the like). The wearable electronic device 1 is configured to transmit information scanned by the scanner 2 to a host computer and the like.

The wearable member 3 has flexibility so as not to hinder an operation of the arm part 101 of the wearer.

In the first exemplary embodiment, the wearable member 3 can be worn along the arm part 101 so as to cover at least a part of a back of the hand and a finger of the wearer, and is configured by fabric that is used for general clothes.

However, the present disclosure is not limited to the above, and the wearable member 3 may be partially or entirely configured by a sheet-shaped member formed of non-woven fabric, synthetic leather, rubber or the like. For the wearable member 3, a material having durability, aeration property, waterproof property and the like is selected depending on uses of the scanner 2.

The wearable member 3 is a component that is to be worn on the arm part 101 of the wearer and enables the scanner 2 to be located on the back of the hand of the wearer. As shown in FIG. 2, the wearable member 3 has a hand part 1h configured to cover mainly a part of the hand and finger of the wearer, and a front arm part 1a configured to cover an elbow side, i.e., a front arm (refer to FIG. 3).

The hand part 1h is formed with an index finger insertion tube part 31 (an index finger engagement part, a first annular member) in which an index finger 102 is to be inserted and which has a tube-shaped wide portion formed at a tip end thereof. Also, the hand part 1h is formed with a thumb insertion tube part 32 (thumb engagement part) in which a thumb 103 is to be inserted and which has a tube-shaped wide portion formed at a tip end thereof.

Also, the thumb insertion tube part 32 has such an open shape that a part corresponding to a nail 103a of the thumb 103 of the wearer and a part closer to the nail 103a than a first joint J1 are opened when wearing the wearable member 3. That is, the thumb insertion tube part 32 has an oven shape of covering up to a half of the distal phalange of the thumb 103 of the wearer when wearing the wearable member 3.

For this reason, there is little possibility that the wearable member 3 will be damaged due to rubbing or hooking in the vicinity of tip ends of the thumb 103 and the index finger 104.

As shown in FIG. 2, the scanner 2 is connected to the scanner trigger 6 via the electronic circuit board 13. The scanner trigger 6 has a circular flat shape, is provided on a side surface 31a of the index finger insertion tube part 31, and is arranged on the thumb 103-side on the proximal phalange of the index finger 102 of the wearer when the wearable member 3 is worn.

A button of the scanner trigger 6 is opened in a non-pressed state. In the state in which the scanner trigger 6 is opened, the scanner 2 does not read a two-dimensional barcode and the like.

The button of the scanner trigger 6 is closed by pressing. In the state in which the scanner trigger 6 is closed, the scanner 2 reads a two-dimensional barcode and the like. Like this, the scanner trigger 6 is provided so as to control the reading operation of the scanner 2.

As shown in FIG. 1, the scanner trigger 6 is provided on the side surface 31a of the index finger insertion tube part 31 of the wearable member 3. When the wearable member 3 is worn on a hand of the wearer, the index finger 102 is inserted in the index finger insertion tube part 31.

Thereby, the scanner trigger 6 is arranged on the side surface 31a of the index finger insertion tube part 31 covering a side surface 102a of the index finger 102.

Therefore, it is possible to provide the scanner trigger 6 on the side surface 102a of the index finger 102, which is difficult to interfere with an article while the wearer performs an operation. Thereby, the wearer can securely operate the scanner trigger 6 without unintentionally operating the scanner trigger 6.

Also, the power supply button 7 functioning as a button for turning on and off a power supply of the scanner 2 has a circular flat shape, and is arranged on an upper surface 32a side of the thumb insertion tube part 32 of the wearable member 3.

The power supply button 7 is connected to the scanner 2 via the electronic circuit board 13. When the user presses the power supply button 7, it is possible to switch on and off states of the electronic circuit board 13 and the scanner 2.

To this end, as shown in FIG. 2, the power supply button 7 is arranged on the upper surface 32a of the thumb insertion tube part 32, which is a part covering a nail side of the thumb 103 when the thumb insertion tube part 32 is worn on the thumb 103. Thereby, the wearer can securely turn on and off the power supply button 7 without unintentionally turning on and off the power supply button 7.

Also, as shown in FIG. 2, surface fasteners (hooks) 23a and 23b and surface fasteners (loops) 24a and 24b configured to engage with each other with the wearable member 3 being wound around the arm are sewn to front and back surfaces of the wearable member 3, respectively. The surface fasteners 23a and 23b and the surface fasteners (loops) 24a and 24b (second annular member) are engaged with each other, so that the wearable member 3 is engaged around the arm of the wearer. That is, an inner diameter of an annular part, which is formed as a result of the engagement of the surface fasteners (loops) 24a and 24b (second annular member), is formed greater than an inner diameter of the index finger insertion tube part 31. Also, the index finger insertion tube part 31 is formed on one end side of the wearable member 3 in one predetermined direction, and the surface fasteners (loops) 24a and 24b are formed on the other end side of the wearable member 3 in one predetermined direction. Although described in detail later, the slider 40 is formed to change a position of the scanner 2 in the one direction, in a region inclined toward the one end side of the wearable member 3.

The surface of the wearable member 3 is provided with a rail 50 functioning as a support part for supporting the scanner 2 functioning as an optical reader. In the first exemplary embodiment, as shown in FIG. 2, the rail 50 is formed to have a narrow width and a long length by flexible synthetic resin. An upper surface of the rail 50 is formed with a plurality of concavity and convexity 54 with predetermined intervals in a longitudinal direction (refer to FIG. 4).

Figure 6:
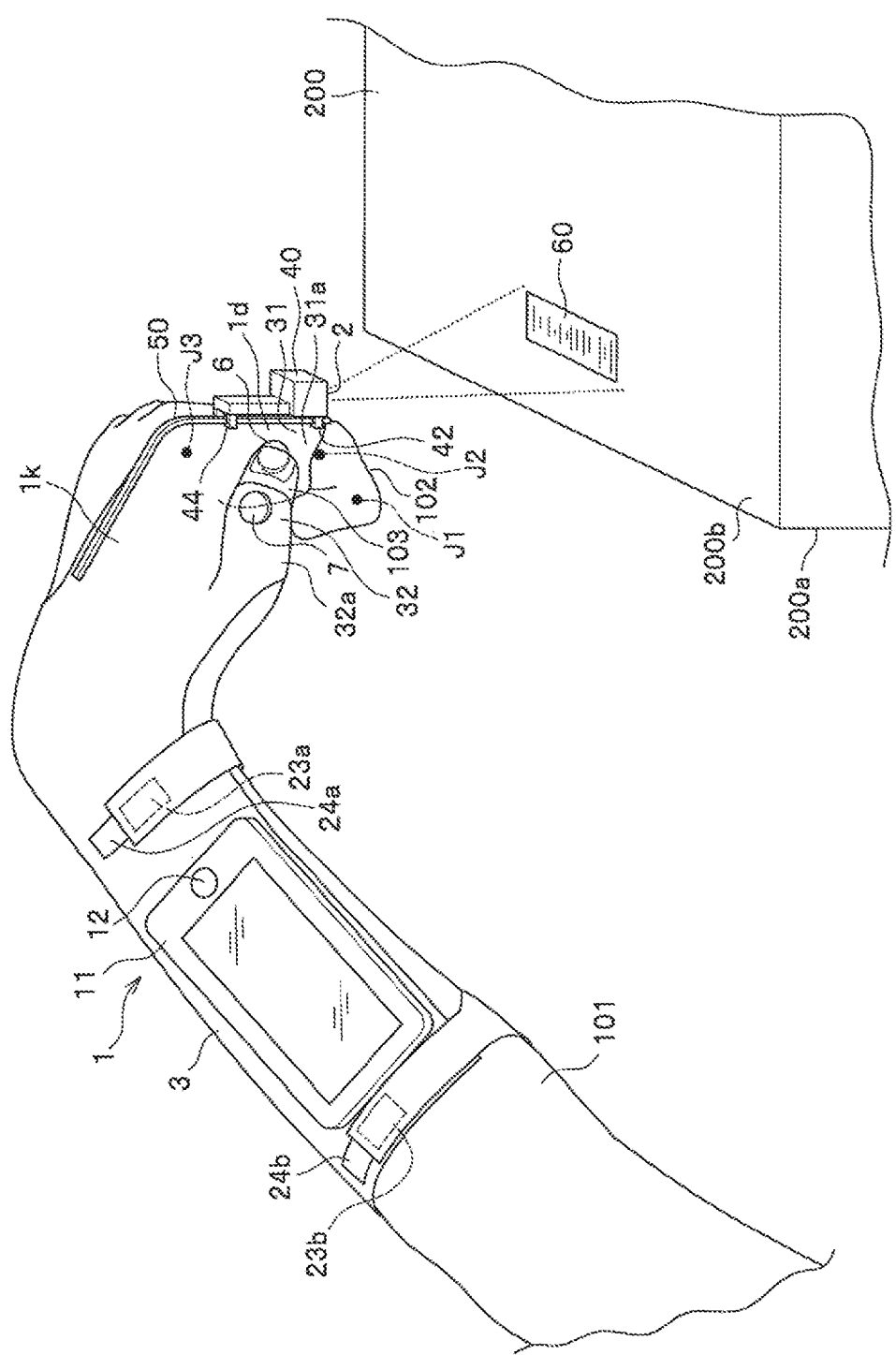
FIG. 6 is a perspective view depicting the wearable electronic device of the first exemplary embodiment, showing an aspect of reading a barcode on an upper wall surface of a baggage.

As shown in FIG. 6, the rail 50 can be bent in an upper and lower direction (an out-of-plane direction of the wearable member 3) together with the wearable member 3. The rail 50 is configured to be easily bendable in a direction in which a finger of the hand is bent.

As shown in FIG. 2, in the first exemplary embodiment, when the wearable member 3 is worn on the hand of the operator, a region is divided into a first region 1k of a part, which corresponds to the back-side of the hand, of the upper surface of the wearable member 3 and a second region 1d of a part, which corresponds to a fingertip-side of the index finger 102 of the hand, with respect to a third joint J3 of the index finger 102 of the hand as a boundary. The rail 50 is provided from the back of the hand of the first region 1k to a space between (on the proximal phalange) a second joint J2 and the third joint J3 in the second region 1d. The rail 50 is configured to be bent in association with movement of the hand accompanied by bending and stretching of the third joint J3.

Figure 4:
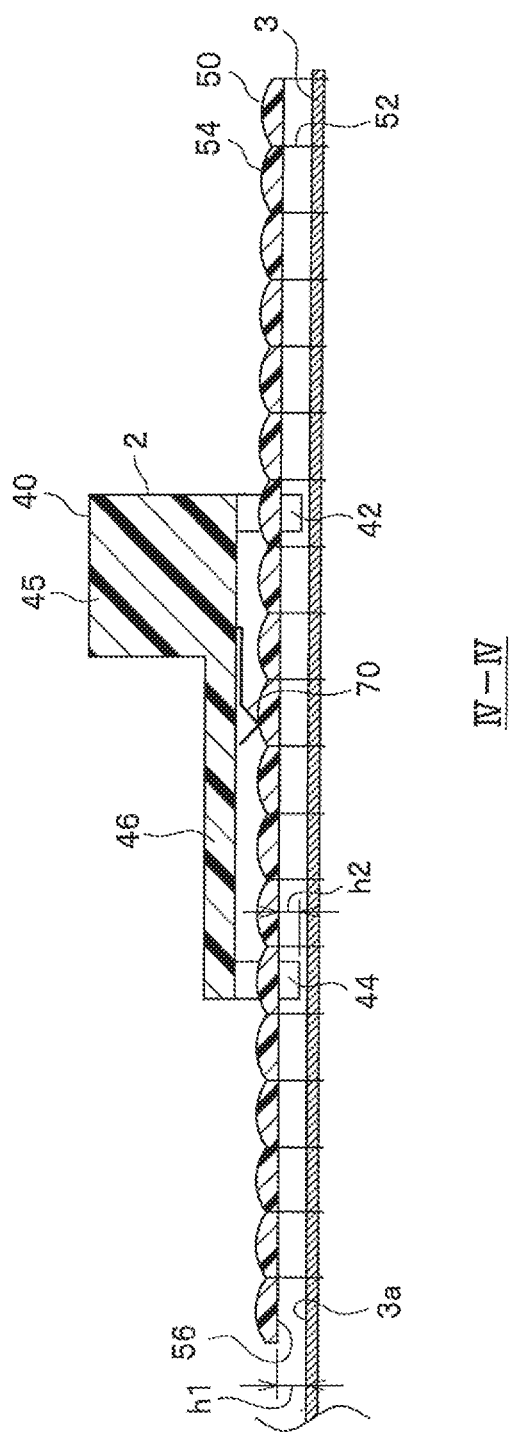
FIG. 4 is a sectional view taken along a line IV-IV in FIG. 3 depicting the wearable electronic device of the first exemplary embodiment, showing a configuration of a slider.

As shown in FIG. 4, in the first exemplary embodiment, the rail 50 is sewn over a substantially entire length by thread of a sewing portion 52. The sewing portion 52 sews a widthwise center of the rail 50 so as to be straightly linear along a longitudinal direction while forming a gap h1 between a lower attachment surface 56 of the rail 50 and the wearable member 3 (refer to FIG. 5). In the first exemplary embodiment, as shown in FIG. 4, the constant gap h1 is formed over the entire length between the attachment surface 56 of the rail 50 and the surface of the wearable member 3.

As shown in FIG. 4, in the first exemplary embodiment, the scanner 2 is provided on the slider 40 capable of sliding along the rail 50.

The slider 40 is placed so that a storage part 45 having a cubic shape is integrated on a pedestal part 46 having a substantially rectangular shape, as seen from above. In the storage part 45, the scanner 2 is accommodated while a reading direction is made to face toward the longitudinal direction of the rail 50.

As shown in FIG. 4, front and rear ends of a lower surface of the pedestal part 46 are provided with a front side holder 42 and a rear side holder 44, respectively. The front side holder 42 and the rear side holder 44 are provided in two pairs with being spaced back and forth in the sliding direction of the slider 40.

Figure 5:
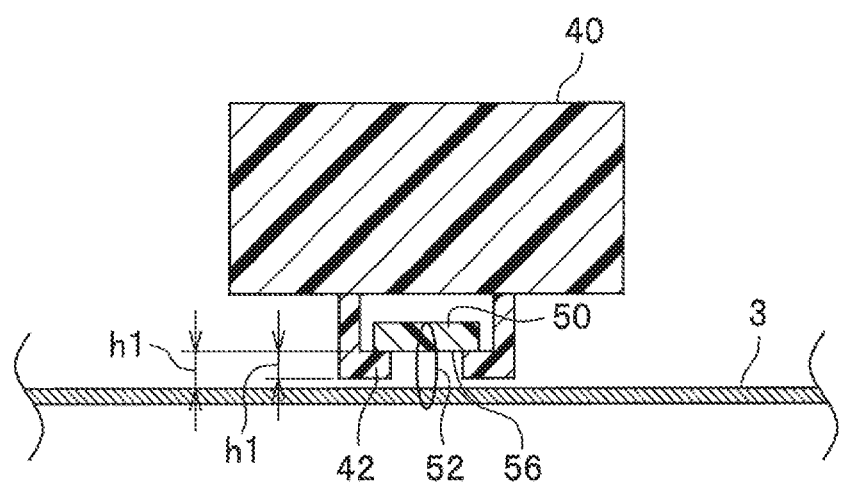
FIG. 5 is a sectional view taken along a line V-V in FIG. 3 depicting the wearable electronic device of the first exemplary embodiment, showing the configuration of the slider.

As shown in FIG. 5, the front side holder 42 has a pair of engaged hooks each of which has an engagement claw extending toward a center of the attachment surface 56 from each of both sides of the rail 50 and also has a substantially L-shaped section. Similarly, the rear side holder 44 has a pair of engaged hooks each of which has an engagement claw extending toward the center of the attachment surface 56 of the lower surface from each of both sides of the rail 50 and also has a substantially L-shaped section.

A height dimension h2 of the hook is set smaller than the gap h1 (h2<h1). Thereby, the slider 40 is configured to be slidable along the rail 50, so that it can slide between at least two regions of the first region 1k of a part, which corresponds to the back-side of the hand, and the second region 1d of a part, which corresponds to a fingertip-side of the index finger 102 of the hand, with respect to the third joint J3 of the index finger 102 of the hand as a boundary, thereby sliding and changing the position of the scanner 2 when wearing the wearable member 3.

Also, the slider 40 is formed to change the position of the scanner 2 to at least two positions in the longitudinal direction of the display panel 11.

As shown in FIG. 4, a center of the lower surface of the pedestal part 46 in the longitudinal direction is provided with an elastic claw 70. The elastic claw 70 has a metallic spring plate piece of which one end is fixed to the lower surface of the pedestal part 46. Also, the other end of the elastic claw 70 is formed to have a mountain-like shape, so that a tip end portion to be in sliding contact with the upper surface of the rail 50 is formed. Also, the tip end portion of the elastic claw 70 is elastically contacted to the concavity and convexity 54 provided on the upper surface of the rail 50 when sliding the scanner 2 along the rail 50. Thereby, a sense of click is generated.

Subsequently, operational effects of the wearable electronic device 1 of the first exemplary embodiment are described.

As shown in FIG. 2, in a state in which the wearable member 3 is wound around the front arm part 1a, the wearer of the wearable electronic device 1 engages the surface fasteners (hooks) 23a and 23b with the surface fasteners (loops) 24a and 24b, thereby wearing the wearable member 3 to cover the back of the hand and the finger.

At this time, the index finger 102 is inserted in the index finger insertion tube part 31, and the thumb 103 is inserted in the thumb insertion tube part 32. Then, the wearer operates the power supply button 7 and the scanner trigger 6 by the thumb 103 and the index finger 102, thereby setting the scanner 2 to a readable state. Thereby, it is possible to perform an operation of reading a barcode 60 bonded on a baggage 200.

Figure 7:
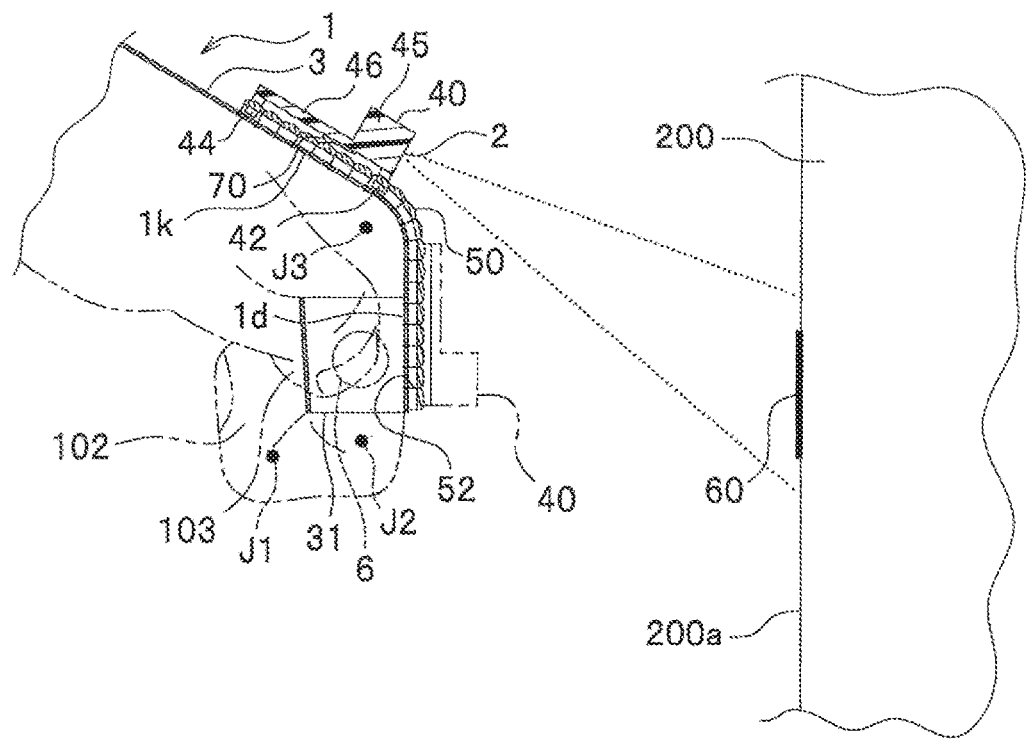
FIG. 7 is a side view depicting the wearable electronic device of the first exemplary embodiment, showing an aspect of reading a barcode on a sidewall surface of the baggage.

As shown in FIG. 7, when a reading target region is located in a relatively low place, like a case in which the barcode 60 is bonded on a side surface 200a of the baggage 200, the slider 40 is preferably arranged in the first region 1k that is a rear position of the rail 50.

The slider 40 engages the elastic claw 70 with the concavity and convexity 54 on the upper surface of the rail 50, thereby fixing the scanner 2 to the back-side of the hand of the upper surface of the wearable member 3. Thereby, even in a case in which the reading target region is located in a relatively low place and the barcode 60 is bonded on the side surface 200a of the baggage 200, it is possible to easily make the scanner 2 face straightly the barcode 60. In the first exemplary embodiment, as shown in FIG. 7, even when the third joint J3 is bent to operate the scanner trigger 6 with the thumb 103, an angle of the scanner 2 provided on the back of the hand does not change. For this reason, it is possible to correctly emit spot light toward the barcode 60, thereby further improving operability.

Basically, it is better to locate the scanner 2 in the first region 1k on the back of the hand so as not to hinder an operation. However, when reading the barcode 60 bonded on an upper surface 200b of the baggage 200 located in a high place, as shown in FIG. 6, there is a limit in bending of the wrist. For this reason, the wearable electronic device 1 can locate the scanner 2 on the second region 1d, which is a fingertip-side of the third joint J3 of the index finger 102. Thereby, as shown in FIG. 8, the wearable electronic device 1 can change the direction of the scanner 2 by using the bending of the third joint J3 of the index finger 102, too.

In the first exemplary embodiment, the position of the scanner 2 can be changed by sliding the slider 40 along the rail 50. As shown in FIG. 8, when a reading target region is located in a relatively high place, like a case in which the barcode 60 is bonded on the upper surface 200b of the baggage 200, the slider 40 is moved and fixed between (on the proximal phalange) the second joint J2 and the third joint J3 of the second region 1d, which is a front position of the rail 50.

Then, as shown in FIG. 6, the wearer stretches the hand and bends the third joint J3 to thus make the scanner 2 face straightly the barcode 60 bonded on the upper surface of the baggage 200, thereby reading easily the information.

Figure 8:
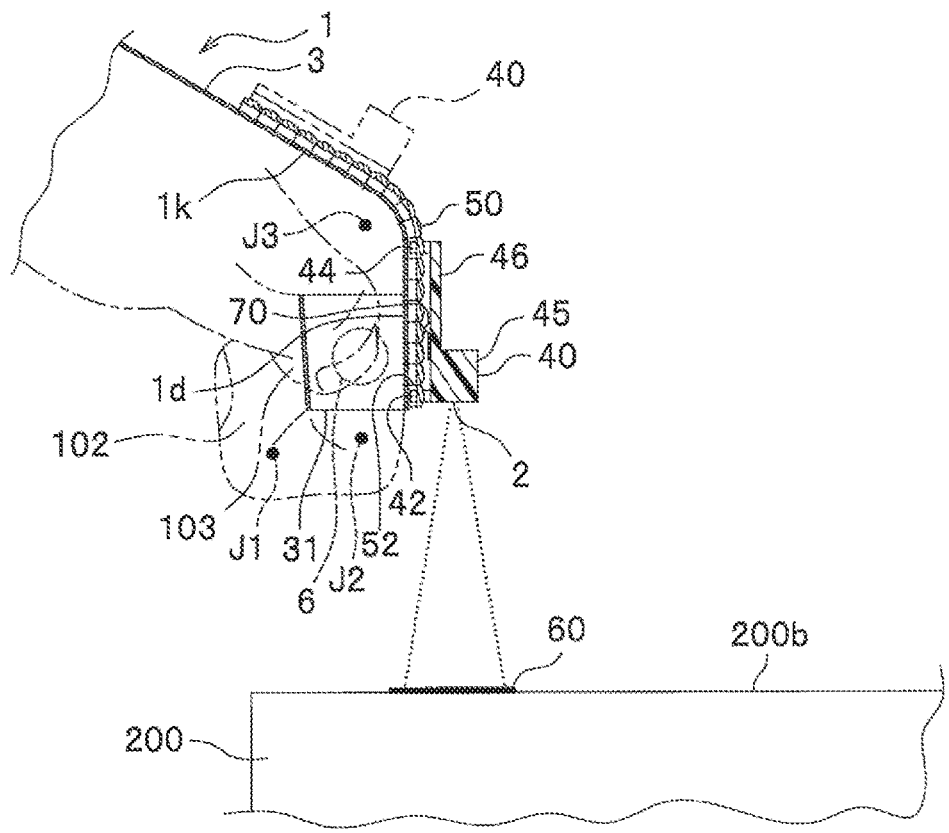
FIG. 8 is a side view depicting the wearable electronic device of the first exemplary embodiment, showing an aspect of reading a barcode on the upper wall surface of the baggage.

In the first exemplary embodiment, as shown in FIG. 8, when the third joint J3 is bent, the scanner trigger 6 comes close to the thumb 103, so that it can be easily operated. For this reason, it is possible to further improve the operability.

Like this, according to the wearable electronic device 1 of the first exemplary embodiment, even when the reading target region is located in the relatively low place or the reading target is located on the top surface of the baggage located in the high place, it is possible to easily perform the reading operation with the scanner 2 by changing the position of the slider 40 along the rail 50, so that it is possible to improve the operability.

That is, even though there is a limit in bending of the wrist, when the scanner 2 is arranged on the farther fingertip-side than the third joint J3 of the index finger 102, it is possible to increase a degree of freedom of the direction of the spot light from the scanner 2 by using the bending of the third joint J3, too, so that it is possible to easily make the scanner face straightly the barcode 60 and to efficiently perform the reading operation.

Second Exemplary Embodiment

Figure 9:
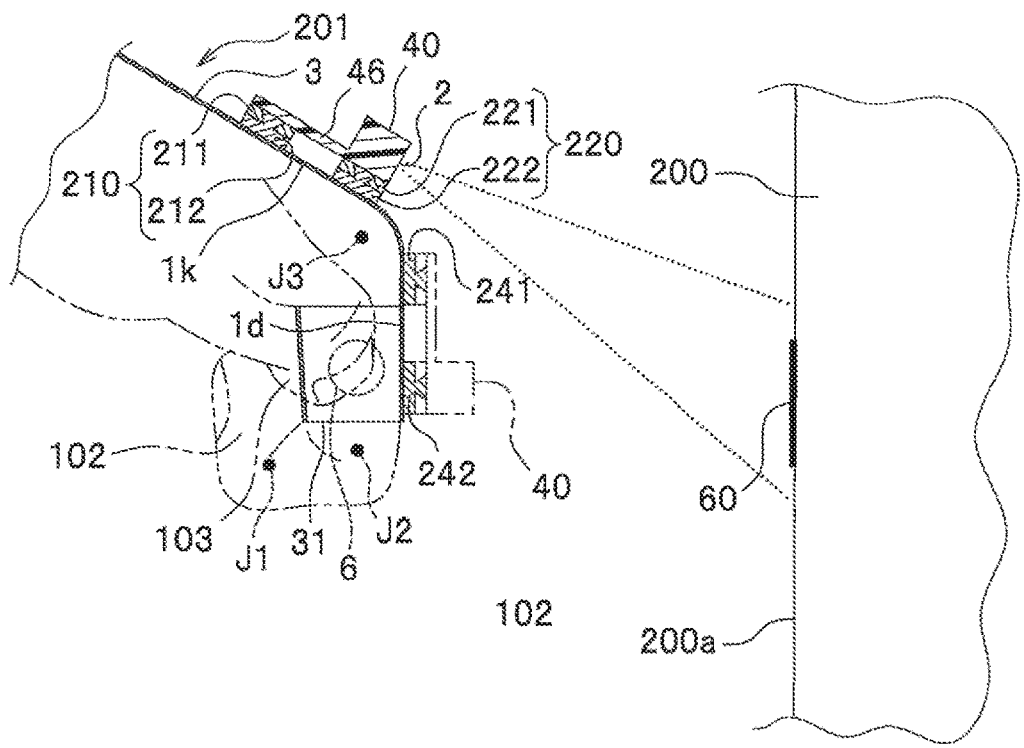
FIG. 9 is a side view depicting a wearable electronic device in accordance with a second exemplary embodiment, showing an aspect of reading a barcode on the sidewall surface of the baggage.
Figure 10:
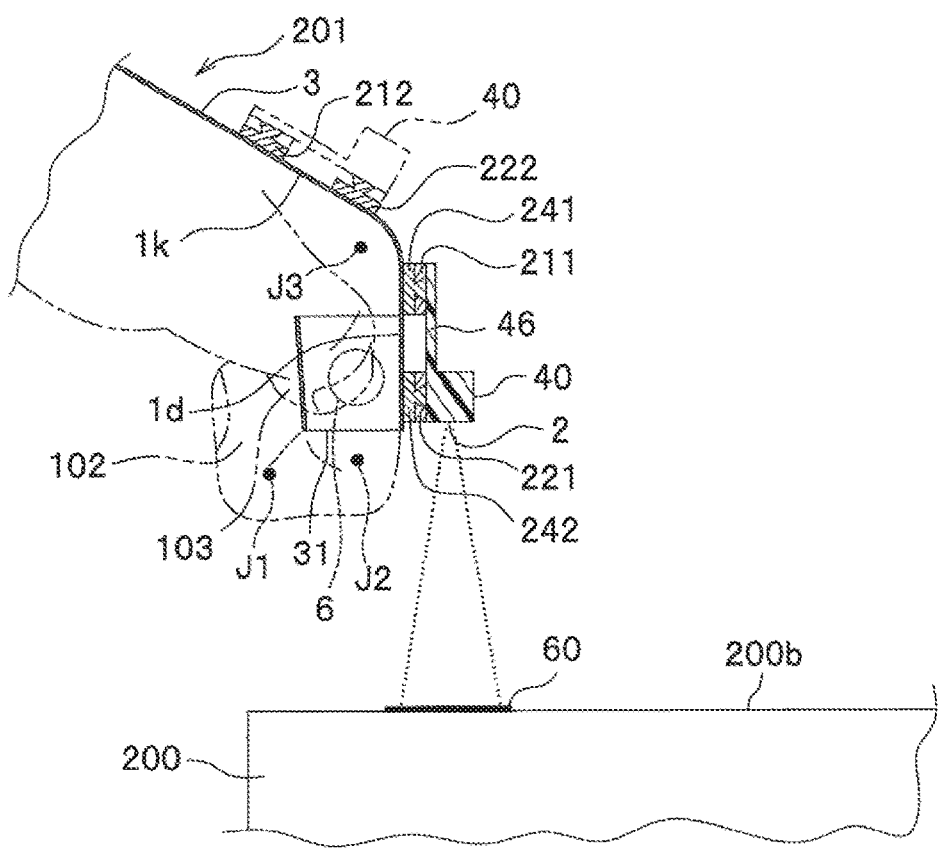
FIG. 10 is a side view depicting the wearable electronic device of the second exemplary embodiment, showing an aspect of reading a barcode on the upper wall surface of the baggage.

FIGS. 9 and 10 depict a wearable electronic device 201 in accordance with a second exemplary embodiment. In the meantime, the parts, which are the same as or equivalent to the wearable electronic device 1 of the first exemplary embodiment, are denoted with the same reference signs and the descriptions thereof are omitted.

In the wearable electronic device 201 of the second exemplary embodiment, the lower surface of the pedestal part 46 is provided with two pairs of hooks 210 and 220 with being spaced back and forth in the sliding direction.

The hook 210 has a convex button 212 having a convex portion, and a concave button 211 having a concave portion engageable with the convex button 212. In the first region 1k, which is a part of the back-side of the hand, of the upper surface of the wearable member 3, with respect to the third joint of the hand as a boundary, the convex button 212 functioning as one support part is fixed. Also, the other concave button 211 is fixed to a rear end portion of the lower surface of the pedestal part 46.

Also, the hook 220 has a convex button 222 having a convex portion, and a concave button 221 having a concave portion engageable with the convex button 222. The convex button 222 functioning as one support part is fixed with being spaced from the convex button 212 in the first region 1k of the wearable member 3. Also, the other concave button 221 is fixed to a front end portion of the lower surface of the pedestal part 46.

The convex buttons 241 and 242 functioning as one support part are fixed on the upper surface of the wearable member 3 between (on the proximal phalange) the second joint J2 and the third joint J3 of the second region 1d up to a part corresponding to the second joint J2 on the fingertip-side of the index finger 102 of the hand, with respect to the third joint of the hand as a boundary. The convex buttons 241 and 242 are configured to engage with and separate from the concave buttons 211 and 221, respectively. Thereby, the wearable member 3 has the support parts provided at two positions between (on the proximal phalange) the second joint J2 and the third joint J3 of the back-side of the hand of the upper surface of the wearable member 3 and the fingertip-side of the index finger 102, with respect to the third joint as a boundary.

In the wearable electronic device 201 of the second exemplary embodiment configured as described above, as shown in FIG. 9, in a case in which a reading target region is located in a relatively low position and the barcode 60 is bonded on the side surface 200a of the baggage 200, the convex button 222 and the concave button 221 are engaged with each other, and the convex button 212 and the concave button 211 are engaged with each other.

Thereby, the scanner 2 is fixed in the first region 1k of the wearable member 3, so that the scanner 2 can be easily made to face straightly the barcode 60. Also, the convex buttons 212 and 222 and the concave buttons 211 and 221 are disengaged. Thereby, the scanner 2 can be removed from the wearable member 3.

As shown in FIG. 10, in a case in which a reading target region is located in a relatively high place and the barcode 60 is bonded on the upper surface 200b of the baggage 200, the convex buttons 241 and 242, which are fixed in the second region 1d between (on the proximal phalange) the second joint J2 and the third joint J3 of the wearable member, and the concave buttons 211 and 221 of the scanner 2 are engaged with each other.

Thereby, the scanner 2 is fixed in the second region 1d between (on the proximal phalange) the second joint J2 and the third joint J3 of the wearable member 3. Therefore, even when the reading target region is located in the relatively high place, like a case in which the barcode 60 is bonded on the upper surface 200b of the baggage 200, the scanner 2 can be easily made to face straightly the barcode 60.

Since the other configurations and implementations are the same as or equivalent to the first exemplary embodiment, the descriptions thereof are omitted.

Third Exemplary Embodiment

Figure 11:
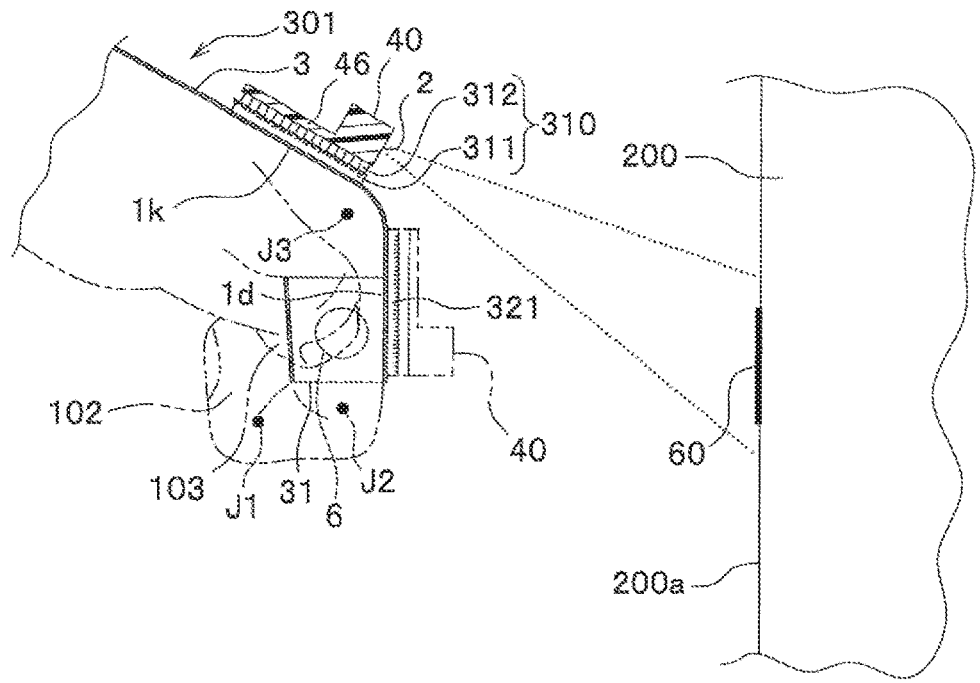
FIG. 11 is a side view depicting a wearable electronic device of a third exemplary embodiment, showing an aspect of reading a barcode on the sidewall surface of the baggage.
Figure 12:
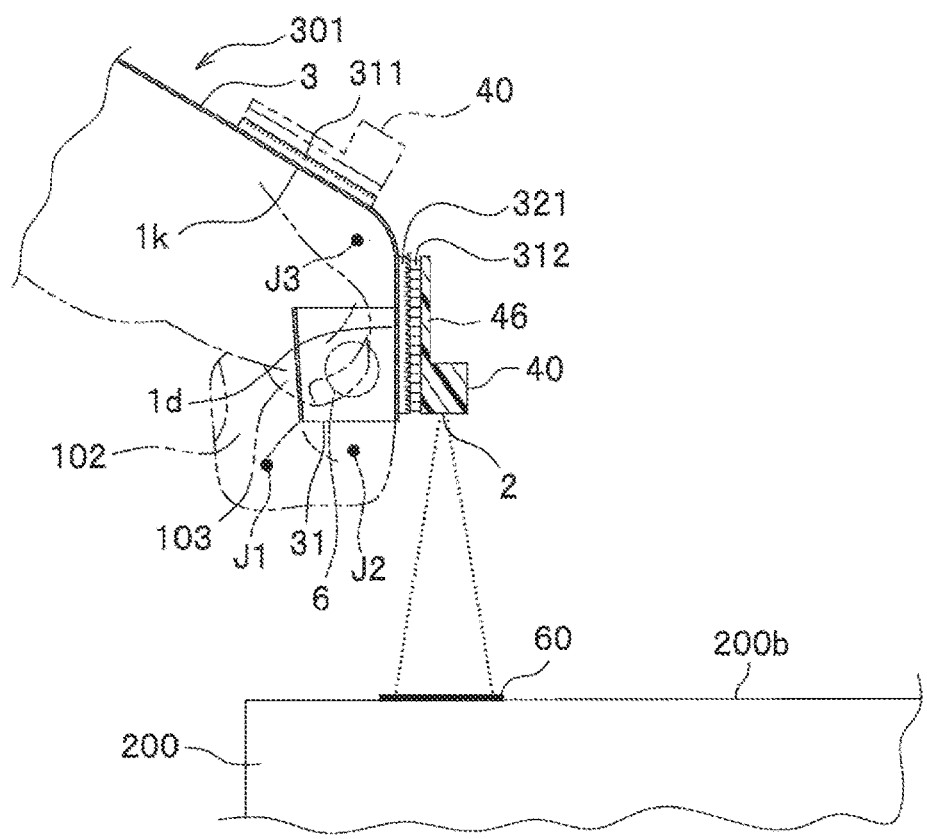
FIG. 12 is a side view depicting the wearable electronic device of the third exemplary embodiment, showing an aspect of reading a barcode on the upper wall surface of the baggage.

FIGS. 11 and 12 depict a wearable electronic device 301 in accordance with a third exemplary embodiment. In the meantime, the parts, which are the same as or equivalent to the wearable electronic device 1 of the first exemplary embodiment, are denoted with the same reference signs and the descriptions thereof are omitted.

In the wearable electronic device 301 of the third exemplary embodiment, the lower surface of the pedestal part 46 is provided with a surface fastener 310. The surface fastener 310 includes a hook material 312 and a loop material 311 and is thus configured to engage with and separate from each other.

The loop material 311 functioning as one support part is fixed in the first region 1k located on the back-side of the hand of the upper surface of the wearable member 3, with respect to the third joint J3 of the hand as a boundary. Also, the other hook material 312 is fixed on the lower surface of the pedestal part 46.

Also, the loop material 311 functioning as one support part and capable of engaging with and separating from the other hook material 312 is fixed in the second region 1d between (on the proximal phalange) the second joint J2 and the third joint J3 up to a part corresponding to the second joint on the fingertip-side of the index finger 102 of the hand, with respect to the third joint J3 of the hand as a boundary. Thereby, the wearable member 3 has the two support parts provided on the back-side of the hand of the upper surface of the wearable member 3 and on the farther fingertip-side than the third joint J3 of the index finger 102, with respect to the third joint J3 of the hand as a boundary.

In the wearable electronic device 301 of the third exemplary embodiment configured as described above, as shown in FIG. 11, in a case in which a reading target region is located in a relatively low place and the barcode 60 is bonded on the side surface 200a of the baggage 200, the hook material 312 is engaged with the loop material 311 fixed in the first region 1k, so that the scanner 2 can be fixed on the back-side of the hand of the upper surface of the wearable member 3. Thereby, the scanner 2 can be easily made to face straightly the barcode 60.

Also, as shown in FIG. 12, in a case in which a reading target region is located in a relatively high place and the barcode 60 is bonded on the upper surface 200b of the baggage 200, the hook material is engaged with the loop material 321 fixed in the second region 1d between (on the proximal phalange) the second joint J2 and the third joint J3. Thereby, the scanner 2 is fixed on the upper surface of the farther fingertip-side than the third joint J3 of the index finger 102 of the wearable member 3. Therefore, even when the reading target region is located in the relatively high place, like a case in which the barcode 60 is bonded on the upper surface 200b of the baggage 200, the scanner 2 can be easily made to face straightly the barcode 60.

Since the other configurations and implementations are the same as or equivalent to the first exemplary embodiment, the descriptions thereof are omitted.

The present disclosure is not limited to the first to third exemplary embodiments, and can be diversely changed and modified without departing from the gist of the present disclosure. For example, the first to third exemplary embodiments have been described in detail so as to easily understand the gist of the present disclosure. For this reason, the present disclosure is not limited as having all the constitutional elements described above. Also, the present disclosure may add the other constitutional element to any constitutional element or change some constitutional elements into other constitutional elements. Also, the present disclosure may omit some constitutional elements.

For example, in the second exemplary embodiment, the pedestal part 46 is provided with two pairs of hooks 210 and 220 with being spaced back and forth in the sliding direction. However, a pair of hooks may be provided. Also, the shape, number and material of the hook 210 are not particularly limited by the second exemplary embodiment. Like this, the manner of the position change may be buttons or the like, and are not particularly limited.

Also, in the third exemplary embodiment, the loop material 311 functioning as the support part and the loop material 321 in the second region 1d between (on the proximal phalange) the second joint J2 and the third joint J3 are fixed in the first region 1k on the back-side of the upper surface of the wearable member 3, as separate members. However, the present disclosure is not particularly limited thereto. For example, one long loop material continuing from the first region 1k to the second region 1d between (on the proximal phalange) the second joint J2 and the third joint J3 may be provided. In this case, the scanner 2 is fixed to parts located in the first region 1k on the back of the hand and in the second region 1d between (on the proximal phalange) the second joint J2 and the third joint J3, which are located on the one loop material.

That is, the shape, number and material of the support part such as the surface fastener are not particularly limited inasmuch as the position of the scanner 2 can be changed to at least two positions of the fingertip-side of the index finger and the back-side of the hand, with respect to the third joint J3 of the index finger as a boundary.

Also, in the first to third exemplary embodiments, the index finger 102 is used. However, the other fingers rather than the index finger 102 may also be used.

For example, in the case of the thumb, since it becomes a boundary allowing an angle, at which the second joint bends, to be large, the fingertip-side is preferably set rather than the second joint.

Also, the scanner 2 is slid up to between the second joint J2 and the third joint J3. However, the present disclosure is not limited thereto. For example, the scanner may be slid up to the farther fingertip-side than the second joint J2, for instance, up to the vicinity of the first joint J1 or onto the distal phalange.

Also, a plurality of fingers adjacent to each other may be inserted in the same finger insertion tube part, and the scanner 2 may be provided on the finger insertion tube part. The adjacent fingers may be any combination of the fingers and may be three or more fingers. Also in this case, the scanner 2 can improve the operation efficiency of reading the barcode 60 more stably.

Even when there is a limit in bending of the wrist, the scanner 2 may be arranged in the part corresponding to the second region 1d on the farther fingertip-side than the third joint J3 of each of the plurality of fingers such as a middle finger 103, a ring finger 104 and a little finger 105. That is, the arrangement of the second region 1d is not limited to the range from the third joint J3 to the fingertip-side of the index finger 102, and the scanner 2 has only to be stably arranged on the farther fingertip-side than the second joint J2 or the first joint J1. In this case, the direction of the scanner 2 can be changed using the bending of each of the first to third joints, too.

Although the exemplary embodiments of the present disclosure have been described, the present disclosure is not limited thereto, and includes the inventions defined in the claims and the equivalents thereto.

What is claimed is:

1. A wearable electronic device comprising:
   an optical reader configured to read information;
   a wearable member configured to be worn on a hand of an operator so as to cover at least a part of a back of the hand and at least a part of a first finger and a second finger of the hand, the back of the hand being a side of the hand opposite to a palm side of the hand; and
   a support part provided on a surface of the wearable member and configured to support the optical reader, wherein the support part is configured to support the optical reader while the wearable member is being worn such that the optical reader is movable between at least two positions, the two positions being a fingertip-side and a back-side of the hand with respect to a boundary that is a third joint of the first finger, and the third joint being a joint from among three joints of the first finger that is closest to the back of the hand, and
   wherein the wearable member has a first opening that, when the wearable member is worn on the hand, opens at a position between a second joint and a first joint of the second finger, the first joint being a joint from among three joints of the second finger that is closest to the fingertip of the second finger.

2. The wearable electronic device according to claim 1, wherein the support part is formed to slide the optical reader between at least the two positions.

3. The wearable electronic device according to claim 1, wherein the support part is a rail capable of being bent together with the wearable member and configured to slide the optical reader.

4. The wearable electronic device according to claim 3, wherein when the wearable member is worn on the hand of the operator, the rail extends from a part corresponding to the back of the hand to a part corresponding to a second joint of the first finger, and a part corresponding to the third joint of the first finger bends in association with movement of the hand.

5. The wearable electronic device according to claim 3, further comprising:

a sewing portion for sewing linearly a widthwise center of an attachment surface with the wearable member along an extension direction of the rail, the attachment surface facing the wearable member, and holders provided on the optical reader and engaged from both sides of the rail toward the attachment surface, wherein the holders are arranged in two pairs which are spaced apart from each other in a sliding direction of the optical reader.

6. The wearable electronic device according to claim 3, wherein the wearable member has a second opening that, when the wearable member is worn on the hand, opens at a position between the third joint and a first joint of the first finger, the first joint being a joint from among the three joints of the first finger that is closest to the fingertip of the first finger, and wherein the rail is arranged so as to extend to a vicinity of the second opening.

7. The wearable electronic device according to claim 3, wherein the wearable member has a second opening that, when the wearable member is worn on the hand, opens at a position between the third joint and a first joint of the first finger, the first joint being a joint from among the three joints of the first finger that is closest to the fingertip of the first finger, and wherein the rail is arranged so as not to extend beyond the opening.

8. The wearable electronic device according to claim 1, further comprising at least one pair of hooks, wherein the support part is one of the pair of hooks, and wherein the other of the pair of hooks is provided on the optical reader.

9. The wearable electronic device according to claim 1, further comprising at least one pair of surface fasteners, wherein the support part is one of the pair of surface fasteners, and wherein the other of the pair of surface fasteners is provided on the optical reader.

10. The wearable electronic device according to claim 1, further comprising a display unit provided on a surface of the wearable member for displaying predetermined information, wherein the support part is formed to change the position of the optical reader to at least two positions along a longitudinal direction of the display unit.

11. The wearable electronic device according to claim 1, further comprising an operation button provided at a position of the wearable member that covers the first finger, and configured to enable the optical reader to start a reading operation.

12. The wearable electronic device according to claim 1, wherein the wearable member is flexible at least partially.

13. A wearable electronic device comprising:

an optical reader configured to read information;

a wearable member of which at least a part is formed by a flexible member;

a first annular member formed on one end side of the wearable member in one predetermined direction;

a second annular member formed on the other end side of the wearable member in the one predetermined direction and having an inner diameter greater than the first annular member;

a third annular member formed on the one end side of the wearable member; and a support part provided on a surface of the wearable member and configured to support the optical reader, wherein the support part is formed to change a position of the optical reader along the one predetermined direction, in a region inclined toward the one end side of the wearable member.

14. The wearable electronic device according to claim 13, wherein the support part is a rail capable of being bent together with the wearable member and configured to slide the optical reader.

15. The wearable electronic device according to claim 13, further comprising at least one pair of hooks, wherein the support part is one of the pair of hooks, and wherein the other of the pair of hooks is provided on the optical reader.

16. The wearable electronic device according to claim 13, further comprising at least one pair of surface fasteners, wherein the support part is one of the pair of surface fasteners, and wherein the other of the pair of surface fasteners is provided on the optical reader.

17. The wearable electronic device according to claim 13, wherein the first annular member has a first opening that, when the wearable member is worn on a hand of an operator, opens at a position between a third joint and a first joint of a first finger of the hand, from among three joints of the first finger, wherein the third annular member has a second opening that, when the wearable member is worn on the hand, opens at a position between a second joint and a first joint of a second finger of the hand, from among three joints of the second finger, and wherein for each of the first finger and the second finger, the first joint is a joint closest to the fingertip of the finger, the third joint is a joint connecting the finger to the hand, and the second joint is the joint between the first and third joints.

\* \* \* \* \*